March 7, 1950  W. E. THIBODEAU  2,499,427
MEANS FOR DESCRIBING ARCS OF LARGE RADII
Filed June 6, 1945  7 Sheets-Sheet 1

Inventor
Wilfred E. Thibodeau
By J. H. Church & W. E. Thibodeau
Attorneys March 7, 1950 — W. E. THIBODEAU — 2,499,427
MEANS FOR DESCRIBING ARCS OF LARGE RADII
Filed June 6, 1945 — 7 Sheets-Sheet 2

Inventor
Wilfred E. Thibodeau
By J. H. Church & W. E. Thibodeau
Attorneys

March 7, 1950 — W. E. THIBODEAU — 2,499,427
MEANS FOR DESCRIBING ARCS OF LARGE RADII
Filed June 6, 1945 — 7 Sheets-Sheet 4

Inventor
Wilfred E. Thibodeau
By J. H. Church & H. E. Thibodeau
Attorneys

March 7, 1950 W. E. THIBODEAU 2,499,427
MEANS FOR DESCRIBING ARCS OF LARGE RADII
Filed June 6, 1945 7 Sheets-Sheet 5

Inventor
Wilfred E. Thibodeau

Attorneys

March 7, 1950     W. E. THIBODEAU     2,499,427
MEANS FOR DESCRIBING ARCS OF LARGE RADII
Filed June 6, 1945     7 Sheets-Sheet 7

Inventor
Wilfred E. Thibodeau
By J. H. Church & W. E. Thibodeau
Attorneys

Patented Mar. 7, 1950

2,499,427

UNITED STATES PATENT OFFICE 2,499,427

MEANS FOR DESCRIBING ARCS OF LARGE RADII

Wilfred E. Thibodeau, Cleveland, Ohio

Application June 6, 1945, Serial No. 597,925

15 Claims. (Cl. 33—27)

(Granted under the act of March 3, 1883, as amended April 30, 1928; 370 O. G. 757)

The invention described herein may be manufactured and used by or for the Government for governmental purposes without the payment to me of any royalty thereon.

This invention relates to curve-describing and tracing apparatus and more particularly to instruments intended to describe arcs of circles of large radii such that the centers thereof are outside of the area or surface upon which the arcs are to be drawn or located.

It is a purpose of the invention to provide a relatively simple, compact device by which the arcs of circles may be described when the centers thereof are inaccessible or cannot be easily materialized, as for example, when they are so long as to fall outside the confines of a drawing board or surface or their inclusion in a machine is not convenient.

Another object is to provide an instrument in which a given arc may be duplicated both as to radius and position relatively to points, lines or surfaces.

A further object is to provide an instrument by which the radius of a given arc may be determined without computation.

Another object is to provide an arc-tracing or arc-scribing instrument that may be used in a single operation with simplicity comparable to an ordinary compass to define an arc that is mathematically exact and accurate.

A still further object is to provide a method whereby any desired number of points lying upon the arc of a circle of desired radius may be quickly and expeditiously located without locating the true center of the arc.

Another object is to provide a method of laying off a line through a given point normal to another line or at a given point on said other line, without striking any arcs and using only linear measurements.

Other objects and advantages of the invention will become obvious as the description advances.

Figures 1, 2, 3, 4, 5, 6, 7:
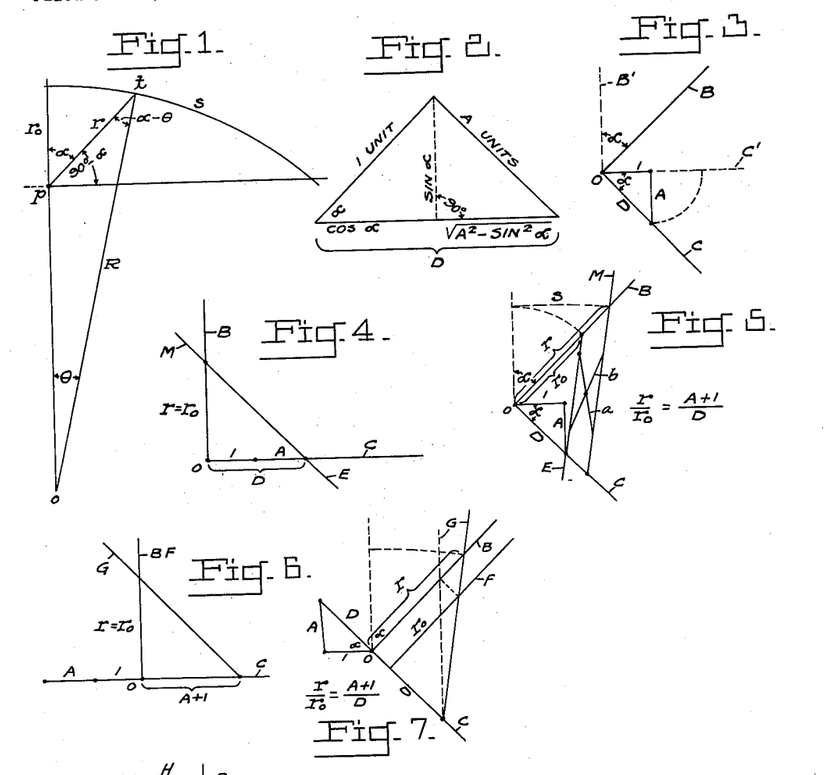
Fig. 1 is a diagram illustrating the geometrical principles upon which the invention is based.
Fig. 2 is a diagram showing the geometrical figure by which an involved variable of the basic equation upon which my invention is based, may be determined.
Fig. 3 is a simplified diagram of a system of links suitable for materializing the geometrical features of Fig. 2.
Fig. 4 is a simplified diagram of a system of links as in Fig. 3, to which have been added other links for materializing the desired locus of points lying upon the arc of a circle, the parts being shown in initial or starting position so that certain parts are superposed.
Fig. 5 is an explanatory diagram showing the system of Fig. 4 with some of the parts rotated through an angle α.
Fig. 6 is a diagram illustrating the linkage arrangement of another, and at present preferred, construction, in initial or starting position.
Fig. 7 is a diagrammatic view of the linkage of Fig. 6 when moved to an intermediate position during an arc-scribing operation.

Referring to Fig. 1, let $s$ be the arc of a circle of radius $R$ and center $O$, and which it is desired to construct by swinging an arm of initial length $r_0$ about the point $p$ as a center, while continuously increasing the length of said arm as a function of the angle $\alpha$ so that the distal end of the arm lies upon the arc. Let $\alpha$ represent the instantaneous angle between the initial position $r_0$ of the scribing arm, $r$ the corresponding instantaneous radius of the scribing arm, and $\theta$ the central angle between the true radii. The problem initially is, then, to derive an equation in which $r$ is expressed as a function of $\alpha$.

From the sine law it follows that:

$$\frac{r}{\sin \theta} = \frac{R-r_0}{\sin(\alpha-\theta)}$$

$$r = \frac{(R-r_0)\sin\theta}{\sin(\alpha-\theta)} = \frac{(R-r_0)\sin\theta}{\sin\alpha\cos\theta - \cos\alpha\sin\theta}$$

$$r = \frac{R-r_0}{\sin\alpha\cot\theta - \cos\alpha} \qquad 1$$

Using the center of the circle as origin and the R line $\theta=0$ as the ordinate axis, the equation for the $r$ line is:

$$y = x\cot\alpha + (R-r_0)$$

and the equation for the R line is:

$$y = x\cot\theta$$

Solving simultaneously for $x$ and $y$:

$$x = \frac{R-r_0}{\cot\theta - \cot\alpha}$$

$$y = \frac{(R-r_0)\cot\theta}{\cot\theta - \cot\alpha}$$

gives the coordinates of intersection of R and $r$. Since R and $r$ are to intersect along the arc of the circle:

$$x^2 + y^2 = R^2$$

Therefore:

$$\frac{(R-r_0)^2}{(\cot\theta-\cot\alpha)^2} + \frac{(R-r_0)^2\cot^2\theta}{(\cot\theta-\cot\alpha)^2} = R^2$$

$$\frac{(R-r_0)^2(1+\cot^2\theta)}{(\cot\theta-\cot\alpha)^2} = R^2$$

$$1 + \cot^2\theta = \frac{R^2}{(R-r_0)^2}(\cot\theta-\cot\alpha)^2$$

$$\csc\theta = \frac{R}{R-r_0}(\cot\theta-\cot\alpha)$$

$$\csc\theta = A(\cot\theta-\cot\alpha)$$

where $$A = \frac{R}{R-r_0}$$

Now solving for $\cot\theta$ for substitution in Equation 1:

$$A\cot\theta - \csc\theta = A\cot\alpha$$

$$A\cot\theta - \sqrt{1+\cot^2\theta} = A\cot\alpha$$

$$1 + \cot^2\theta = A^2\cot^2\theta - 2A^2\cot\theta\cot\alpha + A^2\cot^2\alpha$$

whence $$\cot^2\theta(1-A^2) + \cot\theta(2A^2\cot\alpha) + (1-A^2\cot^2\alpha) = 0$$

and, solving by the quadratic formula:

$$\cot\theta = \frac{-A^2\cot\alpha \pm \sqrt{A^2\csc^2\alpha - 1}}{(1-A^2)}$$

using the minus sign for the radical, and substituting for $\cot\theta$ in Equation 1

$$r = \frac{R-r_0}{\dfrac{-A^2\cos\alpha - \sin\alpha\sqrt{A^2\csc^2\alpha - 1}}{1-A^2} - \cos\alpha}$$

$$= \frac{(R-r_0)(1-A^2)}{-A^2\cos\alpha - \sin\alpha\sqrt{A^2\csc^2\alpha - 1} - \cos\alpha(1-A^2)}$$

$$r = \frac{(R-r_0)(1-A^2)}{-A^2\cos\alpha - \cos\alpha + A^2\cos\alpha - \sqrt{A^2-\sin^2\alpha}}$$

$$= \frac{(R-r_0)(1-A^2)}{-\cos\alpha - \sqrt{A^2-\sin^2\alpha}}$$

$$= \frac{(R-r_0)(A^2-1)}{\cos\alpha + \sqrt{A^2-\sin^2\alpha}}$$

$$= r_0 \frac{A+1}{\cos\alpha + \sqrt{A^2 - \sin^2\alpha}} \qquad 2$$

It should be noted also, that $$A = \frac{\Delta}{\Delta - 1}$$

where $$\Delta = \frac{R}{r_0}$$

Equation 2 may be solved geometrically as shown at Fig. 2 wherein the angle $\alpha$ is laid off between a base D and a side of length equal to one unit to any convenient selected scale, and the third side is constructed of length A to the same scale. Then the length of an altitude dropped to the base is, evidently, $\sin\alpha$, and the length of the base is $\cos\alpha + \sqrt{A^2 - \sin^2\alpha}$. Comparing these values with Equation 2 it will be noted that the ratio of $r$ to $r_0$ is exactly determined by the ratio of the sum of the sides of the triangle of Fig. 2, to its base. For convenience, let the value of $\cos\alpha + \sqrt{A^2 - \sin^2\alpha}$ be represented by D throughout the balance of the description.

Fig. 3 illustrates in simple diagrammatic form, a suitable assembly of parts for materializing and simulating to scale, the triangle of Fig. 2. BOC is a unitary right-angular member, rotatable about the center O and whose initial position is B'OC'. A link of unit length, to the scale of the instrument, is fixed along the direction OC' and has one end coinciding with the center O. A second link, of length A has one end pivoted to the other end of the unit link, and its remaining end pivotally and slidably connected with the arm C. Now, as member BOC is rotated through successive values of the angle $\alpha$, the distance from center O to the position of the end of link A along arm C, is the correct value of D for the corresponding value of $\alpha$. Thus, the linkage shown may be used as an elementary and component part of an instrument in which the value of $r$ from center O, along arm B may be determined for each value of the angle $\alpha$, or may, in itself comprise an instrument from which the value of $r$ may be computed.

Referring to Fig. 4, let BOC represent the unitary right-angular member, as in Fig. 3. Two straight links M and E are shown superposed in this figure, link M being pivoted on arm C at a fixed distance $A+1$ from center O, and slidable along and over arm B. Link E is pivoted on arm B at the adjustably fixed distance $r_0$ from point O, and is pivotally and slidably connected with the outer end of link A so that the intersection of link E with arm C, is maintained at the distance D from center O. This distance is, of course, unique for each corresponding value of $\alpha$. If it be assumed that links M and E are maintained parallel, then, as member BOC is rotated about center O and one end of link A pivots about the adjacent end of the fixed unit link while its other end slides along arm C, similar triangles are maintained such that the point of intersection of link M with arm B is the value of $r$ for the corresponding value of $\alpha$. In short, as member BOC is pivoted, as aforesaid, the point materialized by the intersection of arm B and link M traces the arc of a circle of radius R.

Fig. 5 shows the linkage of Fig. 4 rotated through an angle $\alpha$, wherein crossed links $a$ and $b$ are used to maintain links M and E at all times parallel. From the construction previously described, it will be noted that $$\frac{r}{r_0} = \frac{A+1}{D}$$

so that the locus of points formed by the intersection of link M with arm B is the desired arc of a circle of radius R.

Figures 13, 14, 15, 16, 17, 18, 19:
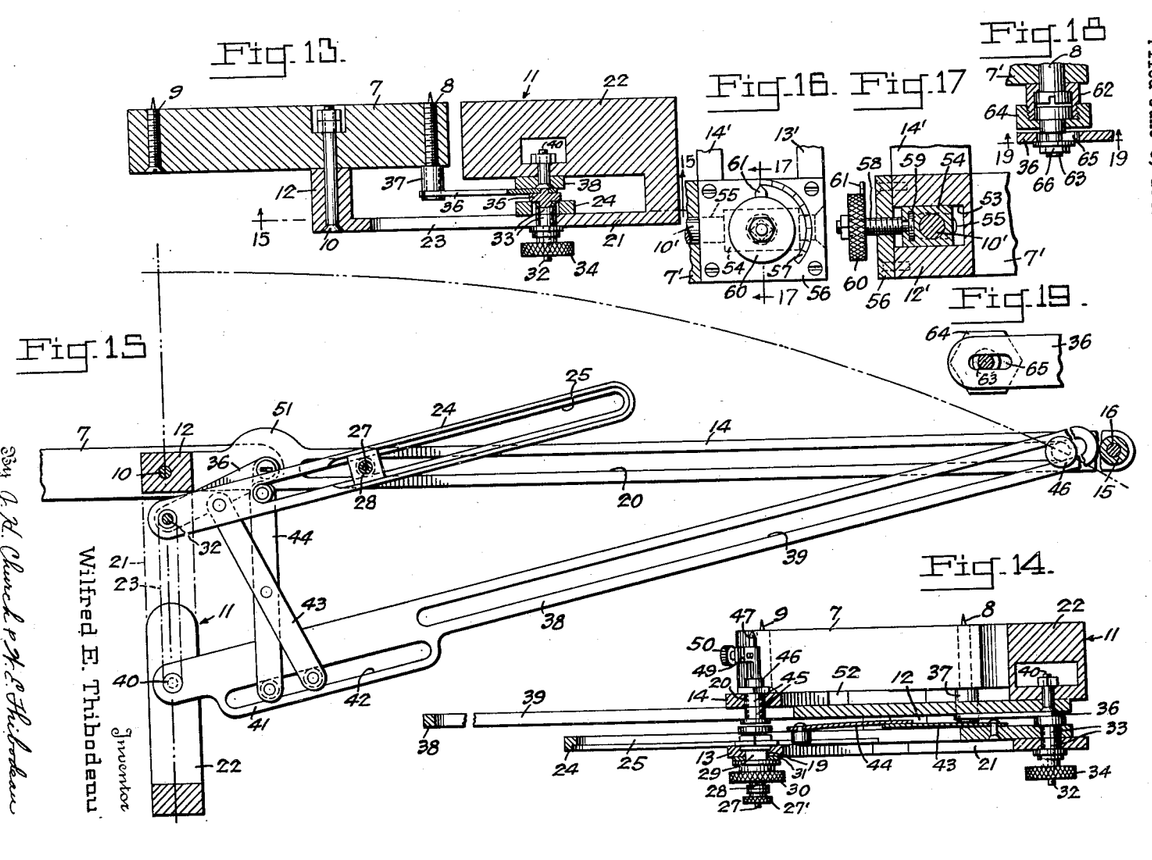
Fig. 13 is a section taken upon the line 13—13, Fig. 10, showing the construction of the fixed base and the pivotal connections thereto of the several links.
Fig. 14 is a section taken upon the line 14—14, Fig. 10, showing the relation of the parallel links and their connections with the control member and right-angled guide.
Fig. 15 is a section taken upon the line 15—15 of Figs. 11, 12 and 13, and showing the parts rotated to substantially one limiting, arc-scribing position.
Fig. 16 is a view partly in section, of a modification suitable for use with the construction of Figs. 10 to 15, inclusive, where it is desired to vary the length of one of the links of the instrument by varying the distance between its pivot axes.
Fig. 17 is a section taken substantially upon the line 17—17, Fig. 16, and showing the manner of shifting the pivot relatively to the link.
Fig. 18 is a view of a second modified construction for permitting the variation of the effective length of one link of the instrument in accordance with the adjustment provided for in Figs. 16 and 17.
Fig. 19 is a section taken upon the line 19—19, Fig. 18.

At Figs. 10 to 15, inclusive, I have shown a form of instrument embodying the principles of my invention and based upon the diagrammatic illustrations of Figs. 4 and 5. In these figures, the numeral 7 identifies a base having spaced apertures within which pointed fixing screws 8 and 9, Fig. 13, are threaded as an aid in maintaining the line joining the axes of said screws in coincidence with the chord of the arc to be drawn. A pivot pin 10 fits a bore in base 7 in such a position that the distance between the axes of pin 10 and screw 8 represents one unit to any convenient scale. Since ratios only are involved in the operation of this portion of the instrument, the said unit distance may have any practical value that will be determined by the physical size and capacity of the model being constructed.

Figures 10, 11, 12:
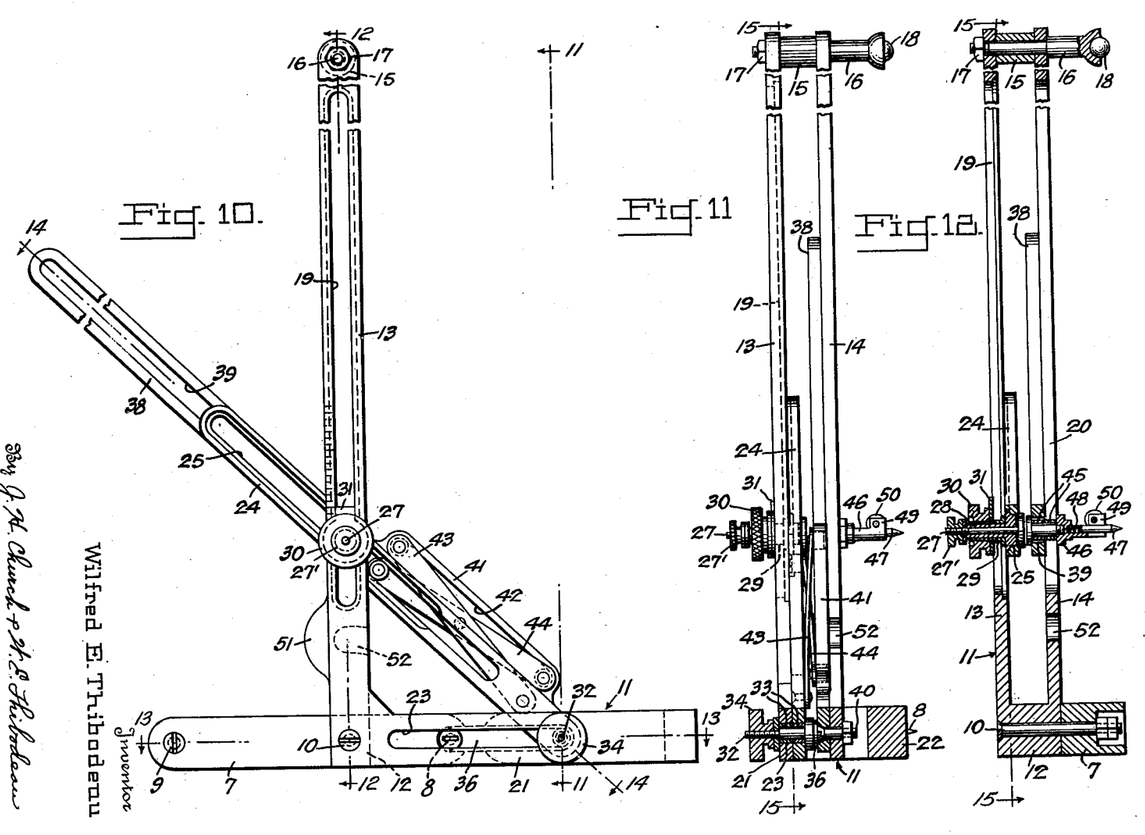
Fig. 10 is a plan view of one form of the invention utilizing the principles illustrated at Figs. 4 and 5, and constructed to directly trace arcs of desired, predetermined radii.
Fig. 11 is a view, partly in section, taken upon the line 11—11, Fig. 10.
Fig. 12 is a section taken upon the line 12—12, Fig. 10, and showing in detail the scriber and one pivot joint of the instrument.

A right-angled guide member 11 includes a hub 12 bored to fit pin 10, and two parallel arms 13 and 14 extending radially from said hub and bore and spaced axially of pin 10, as clearly shown at Fig. 12. In the interests of rigidity and ease of operation, arms 13 and 14 are connected at their outer ends by a spacing collar 15. A special supporting bolt 16 passes through collar 15 and aligned holes in arms 13 and 14 to rigidly connect said arms in parallel relation, by means of a nut 17. Bolt 16 has its lower end shaped to revolubly mount and retain a ball 18 and is so dimensioned that, when ball 18 rests upon a plane surface, arms 13 and 14 will be substantially parallel thereto. It will be noted, too, from Figs. 10, 12 and 15, that arms 13 and 14 are provided with slots 19 and 20, respectively.

Guide member 11 also has a portion shown in cross section upon Fig. 13, and comprising an arm 21, slotted as at 23 and extending from hub 12 at right angles to arms 13 and 14. At its outer end, arm 21 carries a thickened base part 22 so dimensioned that its lower surface is coplanar with the lower surface of base 7 when the parts are assembled in normal operating condition. It will thus be appreciated that guide member 11 may pivot as a unit about the axis of pin 10, relatively to base 7. The distance between screw 8 and pin 10 is fixed and represents unit dimension to any convenient scale which dimension in the present example remains fixed in direction during an arc-scribing operation.

A link 24 has a slot 25 therein extending for practically its entire length. As shown at Fig. 12, means are provided whereby arm 13 of member 11 and link 24, may be pivotally secured together at various selected distances from pin 10, depending upon the radius of the arc to be traced. This means may consist of a pivot joint including a bolt 27 fitting a central bore in a bushing 28 that has portions of different diameters, separated by a flange. The larger diameter portion fits between the sides of slot 25. The flange, which may be square, has a transverse dimension to fit between shoulders formed by rabbeting the corners of slot 24 on the side adjacent link 28, the dimensions being such that the flanged surface extends slightly—a few thousandths of an inch, above the adjacent surface of the link.

Furthermore, the larger diameter portion of bushing 28 terminates short of the lower surface of link 24. The smaller diameter portion of bushing 28 extends through slot 19 in arm 13 and slightly beyond the adjacent end of a second bushing 29 rotatably fitting the smaller diameter portion of bushing 28 and having an outer diameter to fit slot 19. Bushing 29 has a flanged head at one end having a dimension slidably fitting between shoulders formed by rabbeting the corners of slot 19 on the side adjacent link 24. A nut 30 is threaded upon the projecting end of bushing 29. A washer 31 is interposed between nut 30 and arm 13, and has a projection shown at Figs. 10, 11 and 12 which acts as an indicator in cooperation with a scale on the side of arm 13 to give the setting of bolt 27 in terms of the true radius of the arc to be drawn. A second nut 27' is threaded upon bolt 27 and, when turned down, engages the projecting smaller diameter portion of bushing 28, to clamp link 24 between the flange on said bushing and the head upon bolt 27. Also when nut 30 is turned down, it acts to clamp arm 13 between the shoulder on bushing 29 and washer 31. Since all pivotal movement between the links and arm appears as a relative rotation between bushings 28 and 29, these bushings may, if desired, be square on exterior cross section on those portions fitting their respective slots. Thus, the pivot axis may be locked relatively to both link 24 and arm 13, by simply tightening both nuts 30 and 27'. Or, by leaving one nut loosened the said axis may have sliding pivotal association with the corresponding link or arm. Thus, for example, when nut 30 is turned down, while nut 27' is loosened, the pivot axis of bolt 27 is fixed relatively to arm 13 while, at the same time, link 24 may pivot and slide thereon.

The lower end of link 24 extends beneath the slot in arm 21. A bolt 32 projects through both arms and carries aligned sleeves 33 having a slightly greater total axial dimension than the combined thickness of link 24 and arm 21 and an outer diameter snugly fitting the slot 23 in arm 21 and an aperture in link 24. A nut 34 is threaded onto the end of bolt 32 to hold the arm and link against separation while, because of the aforesaid dimension of sleeves 33, the parts 21 and 24 may freely pivot about and slide relatively to bolt 32. In short, bolt 32 materializes a point determined by the intersection of the longitudinal axes of arm 21 and link 24.

From Fig. 13, it will be noted that the headed end of bolt 32 has a pintle 35 concentric of its axis and fitting the aperture in one end of a link 36. The other end of said link is pivoted on screw 8, there being a sleeve 37 on the screw, interposed between base 7 and link 36 to maintain the latter in the proper plane of operation. The effective length of link 36, will be recognized as the distance A in the schematic illustration of Fig. 5 whereby, as guide member 11 is swung about the axis of pin 10, link 36 is also pivotally moved about screw 8 and a sliding movement of bolt 32 along slot 23, is effected to thereby vary the aforesaid point of intersection of arm 21 and link 24 along arm 21.

A link 38 has a slot 39 extending from one end for a substantial distance. The other end of the link is pivoted to the thickened base part of arm 21, as by a bolt 40 and it will be noted that the distance between the axes of pin 10 and bolt 40, materializes the dimension (A+1) of explanatory Fig. 4. Incidentally, it should also be noted that, in Figs. 11, 13 and 14, the axes of bolts 32 and 40 are shown in alignment merely because the parts are there shown in the initial or starting position and that said axes move out of alignment as soon as the arc-tracing operation begins, as will be evident from inspection of Fig. 15.

Link 38 has an integral offset portion 41 (see Figure 15) provided with a slot 42 and is connected to be maintained in parallelism with link 24, by means of pivotally connected crossed links 43 and 44 having rollers on their ends fitting the respective slots in a manner obvious from inspection of Figs. 10 and 15. The intersection of link 38 with arm 14 defines the tracing point of the desired arc. This point is materialized by sleeves 45 fitting slots 39 and 20. A scribing device 46 has a shank journaled within sleeves 45 and a tubular extension adapted to receive a lead or tracing point 47 urged outwardly by a spring 48, Fig. 12. The device 46 may be provided with a split collar 49 and a clamping screw 50 to hold the lead 47 in adjusted position when desired. Arm 14 is provided with a "gooseneck" portion 51, slotted as at 52, to accommodate sleeve 37 as arm 14 approaches its position shown on Fig. 15.

The operation of the species just described, will now be clear from the foregoing description. The base 7 is positioned so that the points 8 and 9 lie upon the chord of the arc desired to be drawn with the axis of pin 10 coincident with what will be the mid ordinate of said arc. Nut 30 is then loosened and bolts 32 and 40 being concentric, links 24 and 38 are pivoted as a unit about the presently common axis of these bolts to thereby move bolt 27 and tracer 47 until their presently common axis lies on the mid point of the arc to be drawn. Nut 30 is now tightened to fix the pivot bolt 27 at the distance $r_0$ from the axis of pin 10.

Guide member 11 is now rotated about pin 10 whereupon, the axis of bolt 40 traverses an arc of radius (A+1) about the axis of pin 10. Because of link 36, bolt 32 is constrained to slide along slot 23 and thus determine the continuously varying location of bolt 32 (i. e. the post of arm 24) along arm 21 for each corresponding value of the angle of rotation of member 11 from initial position, i. e., the angle $\alpha$ of Equation 2. As another point on link 24 is determined by bolt 27 and nut 30 at the set distance $r_0$ from pin 10 measured along arm 13, the position of link 24 is determined and unique for each value of the angle $\alpha$. Likewise the position of link 38 is determined since it is pivoted at one end by bolt 40, to member 11, while, at the same time, it is maintained parallel to link 24. Thus the element 47 materializing the intersection of link 38 with arm 14, describes the desired arc in accordance with Equation 2.

The radius of the arc can be varied by adjustment of either $r_0$ or A. A change in $r_0$ alone will give arcs of varying heights and corresponding varying radius of arc due to the constancy of $$\frac{R}{R-r_0}$$

Changes in A, on the other hand, $r_0$ being constant will yield a series of arcs through the extremity of $r_0$. Thus, variability of both A and $r_0$ will afford extreme flexibility as to the radius of the arc and its height.

In Figs. 16 and 17 I have shown, a construction that may be embodied in the species of Figs. 10 to 15, inclusive, when it is desired to vary the value of A. Since the distance between pin 10 and bolt 40 is (A+1), the effective value of A may be conveniently varied by changing the distance between parts 10 and 40. In the construction shown, 7' represents a base to which the arms 13' and 14' of member 12' are pivoted by means of pin 10'. Member 12' is provided with a cavity 53 having parallel side walls and within which slides a block 54, bored to receive pivot pin 10' which extends upwardly from base 7' into said block through a slot 55 in member 12'. A plate 56 is secured to member 12' over the open side of cavity 53 and has a threaded opening and a scale 57 concentric to said opening.

A thumbscrew 58 engages the threaded opening and is swiveled to block 54, as at 59 so that, when turned, block 54 is translated relative to cavity 53 and the effective distance between pin 10 and bolt 40 is varied. The head 60 of screw 58 has a pointer 61 coacting with graduations 57 to gage the amount of turning of the screw and to repeat any desired previous setting of the instrument. The gage may be graduated in terms of $R/r_0$. It is of interest to note the small adjustment required for the distance A for correspondingly large changes in radii. For example, if $R/r_0=10$, $A=1.111$, while if $R/r_0=20$, $A=1.053$. Thus a change of .058 unit in the effective length of the arm 21 will double the value of R for any selected value of $r_0$. It will be noted too, that this, as well as the modifications subsequently to be described, are capable of describing the complete arc, since the linkages representing unit distance and the distance A+1, will operate for their intended purpose whether the upright carrying the scriber is swung through the first or the second quadrant.

Figs. 18 and 19 show a form of adjustable pivot for accommodating and correspondingly adjusting the effective length of link 36 when adjustment is made in the effective value of A by turning of knob 60, Figs. 16 and 17. In Figs. 18 and 19, 8' is the pivot screw fixed in base 7'. A threaded sleeve 62 has a flange at one end fitting beneath the head of screw 8'. A stud 63 has a head fitting within sleeve 62 and having its shank projecting through a central opening in a cap 64 threaded upon sleeve 62. The end of stud 63 projects through a slot 65 in arm 36 and is clamped in adjusted position along the slot by a nut 66 threaded upon stud 63. When adjustment in the effective value of A is to be made, nut 66 is loosened, adjustment of knob 60 to the desired value as indicated upon scale 57 is made and nut 66 again tightened. It will be understood that the axes of pivot pin 10, fixing screw 8, and bolts 32 and 40 are coplanar at the time this adjustment is made.

Figs. 6 and 7 show a second form of the invention wherein O is the origin or mid-point of the chord of an arc to be drawn. A link of unit length extends from O to the left and is fixed to the drawing surface. A member comprising integral, angularly-related arms B and C, is pivoted at point O, at the juncture of said arms. A link G is pivotally connected at one end with arm C, at a distance (A+1) from point O so that said link intersects arm B. A second member has angularly related arms, one of which coincides with, and is slidably connected with, arm C so that its other arm F is maintained at all times parallel to arm B. Arms B and F coincide upon Fig. 6. The second member projects to the left of point O and there has its end pivotally connected with one end of a link of length A. The other end of this link is pivoted to the end of the unit link remote from point O. Link G is pivoted to arm F at a distance $r_0$ measured from arm C along arm F. Thus, as the two aforesaid members are pivoted about O, arm F is slid along arm C so that its distance from the pivot between arm C and link G is at all times equal to the distance D, as defined in connection with Fig. 2. From inspection of Fig. 7, it is clear that $r/r_0=(A+1)/D$ so that, in accordance with the basic equation, the point of intersection of link G with arm B, determines the locus of points of the desired arc.

Figures 20, 21, 22:
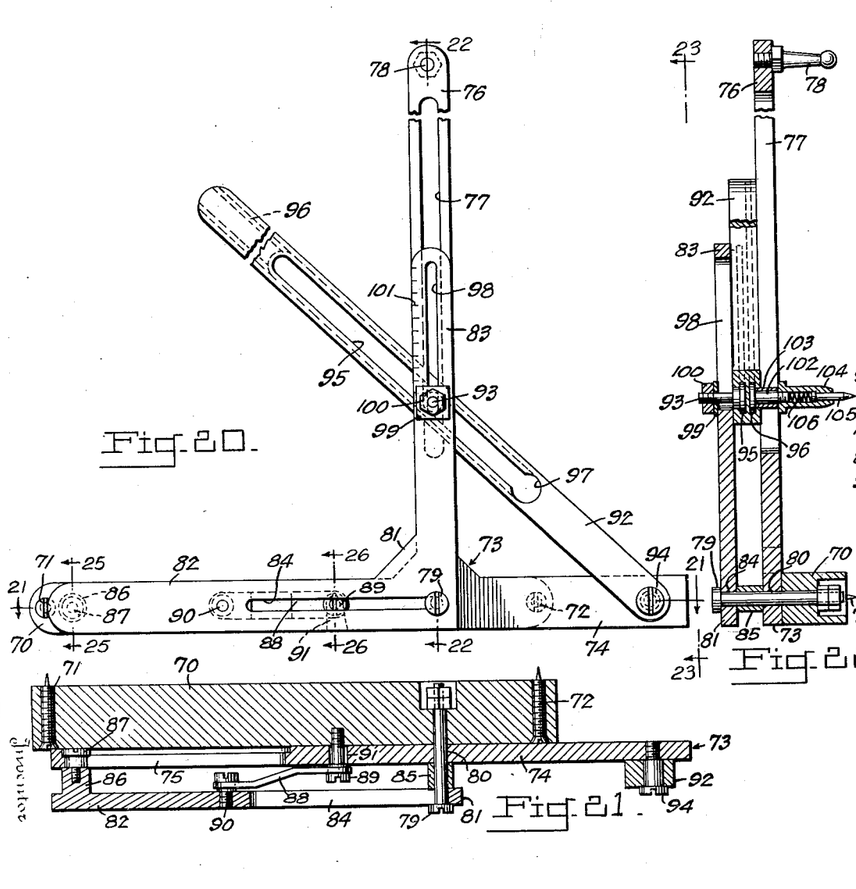
Fig. 20 is a plan view of a preferred form of the invention showing the parts in initial position.
Fig. 21 is a section taken upon the line 21—21 of Fig. 20, with the parts in the position prior to the start of an arc-scribing operation.
Fig. 22 is a section taken upon the line 22—22 of Fig. 20, and looking in the direction of the arrows.
Figure 23:
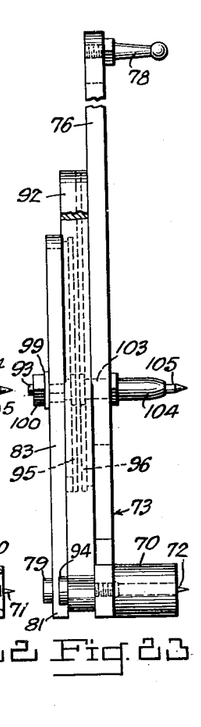
Fig. 23 is a side elevation of the instrument taken substantially upon the line 23—23 of Fig. 20.
Figures 24, 25, 26:
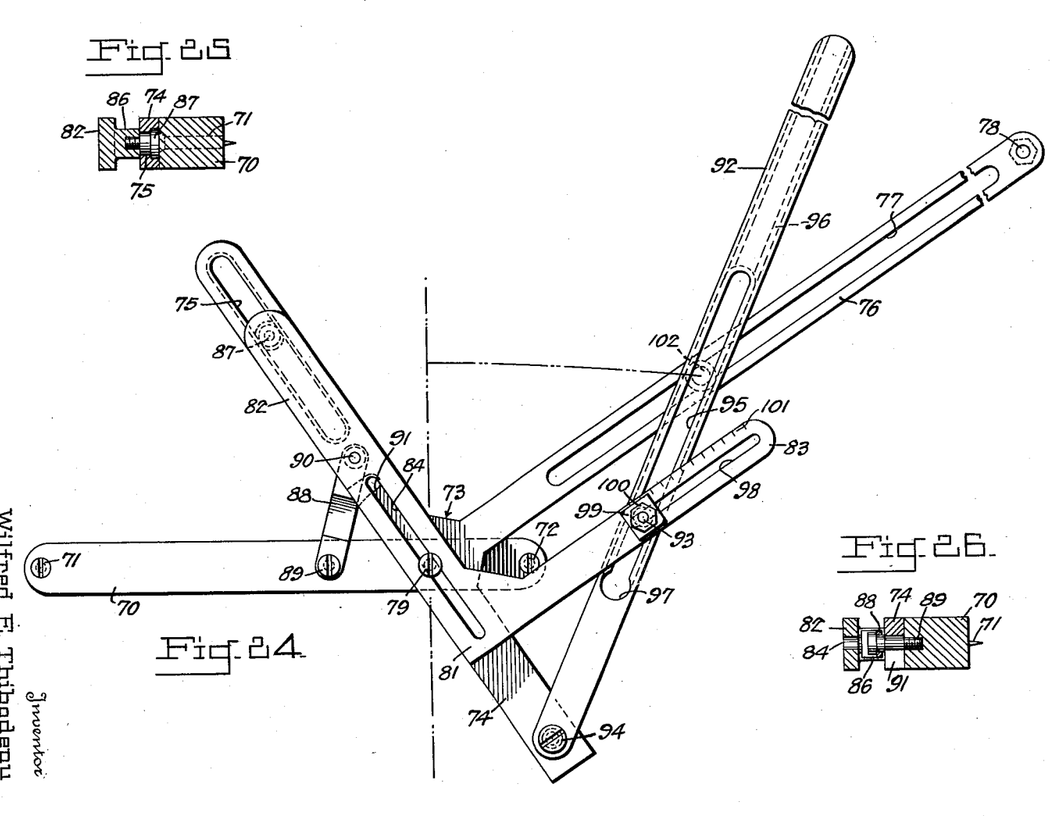
Fig. 24 is a plan view similar to Fig. 20, but showing the parts in the relative positions assumed during a curve-scribing operation.
Fig. 25 is a section taken upon the line 25—25, of Fig. 20, and showing one sliding connection between one pair of arms of the two right angular members.
Fig. 26 is a section taken upon the line 26—26, of Fig. 20, and showing the other sliding connection between said pair of arms.

Figs. 20 and 26, inclusive, depict the form of the invention materializing the arrangement of Figs. 6 and 7. In these figures 70 identifies a base that may conveniently be in the form of a rectangular bar having pointed screws 71 and 72 threaded into apertures adjacent its ends whereby the base may be fixed in line with the chord of an arc to be drawn. A member 73, generally in the shape of a T, has a head 74 slotted at one end as at 75, and an arm or shank 76, slotted as at 77 and provided at its free end with a support 78 whereby the member is supported parallel to the surface upon which the instrument is being used. A pivot pin 79 is secured within a bore in base 70, and head 74 is pivoted on this pin at 80, at the point of intersection of the longitudinal axes of head 74 and shank 76.

A right-angled member 81 has arms 82 and 83. Arm 82 has a longitudinal slot 84 extending from one end to a point about midway of the arm. Pin 79 extends through this slot and the arm is held against the head of pin 79 by means of a spacing collar 85. The other end of arm 82 has a projection 86 of the same axial dimension as collar 85 and a headed screw 87 passes through slot 75 in head 74 and engages a threaded aperture in said projection. In this manner arm 82 is mounted for sliding movement only relatively to and along head 74 so that arms 76 and 83 are maintained parallel at all times.

A link 88, of effective length A, is pivoted at one end to base 70, by means of a screw 89, and at the other end to arm 82, by means of a screw 90. From Figs. 20, 24 and 26, it will be noted that head 74 has a slot 91 loosely fitting around screw 89 so that the parts 70, 74 and 82 may be moved into the initial superposed position shown in Fig. 20. A link 92 has parallel undercut longitudinally-extending channels in its upper and lower sides, as indicated at 95 and 96, Fig. 22. Link 92 is pivoted at one end to head 74, by means of a screw 94. A pivot bolt 93 has a head shaped to slidably fit its channel 95 (Fig. 22) and the smaller portion of this head has a diameter greater than the width of the slot 98 and, furthermore, projects a little above the upper surface of link 92. A nut 100 engages the shank of bolt 93 and, when turned down, clamps bolt 93 in position relatively to arm 83, while, because of the construction previously described, the head of said bolt may at the same time slide along channel 95 in link 92. A washer 99, between nut 100 and arm 83 may have lugs fitting slot 98 to prevent turning relatively thereto. One edge of this washer acts as an indicator over a scale 101 formed along one edge of arm 83. This scale may be graduated in terms of radii of the arcs desired to be scribed.

A pivot bolt 102, Fig. 22, has a head snugly fitting channel 96 with its shank extending through slot 77 in arm 76. A sleeve 103 of the same outer diameter as the width of slot 77, surrounds said shank. A flanged scriber barrel 104 engages the threaded end of bolt 102 projecting below slot 77. As the sleeve 103 projects a little below the lower surface of arm 76, the flange on barrel 104 has a slight clearance with arm 76 so that the scriber barrel and bolt 102 may slide freely along both arm 76 and link 92. A scriber 105 slidably fits an axial bore in barrel 104 and is urged outwardly by a spring 106. It will be noted that channel 95 need be only relatively short, while, to provide maximum capacity for a given instrument, channel 96 should extend to the outer end of its link 92.

The operation will be clear from the previous description including that advanced in connection with Figs. 6 and 7. The instrument with parts in the relative position shown in Fig. 20, is located so that the points of screws 71 and 72 are on the chord of the arc to be scribed, with the axis of pin 79 at the center of the desired chord. Nut 100 is loosened and link 92 is swung about pivot screw 94 until the indicator edge of washer 99 indicates the desired radius on scale 101. The nut is then tightened to fix bolt 93 relatively to arm 83. Shank 76 is then caused to pivot about pin 79. Since link 92 is fixed at one end to head 74 and at a remote point to arm 83 of member 81, while the screw 90 in the other arm 82 of said member is constrained by 88 to circular motion about screw 89, pivoting of shank 76 effects sliding of arm 83 relatively thereto. Thus scriber 105 is caused to travel outwardly along arm 76 as the intersection of said arm with link 92 moves outwardly in proportion to turning of member 73. As explained in connection with Figs. 6 and 7, this intersection at all times lies on the locus of points of a circular arc.

Figure 8:
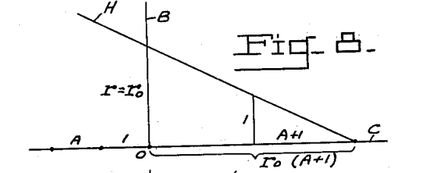
Fig. 8 is a schematic plan view of another modification and showing the parts in initial position.
Figure 9:
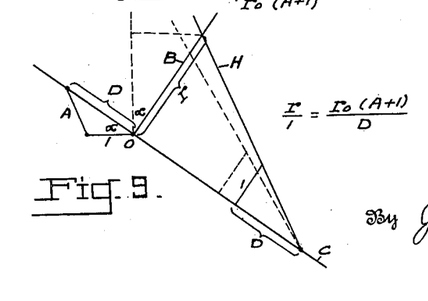
Fig. 9 is a view of the modification of Fig. 8, showing the parts in the relations assumed during the drawing of a curve.

In Figs. 8 and 9, I have shown diagrammatically another construction by which the basic principles of the invention may be carried out. Arms B and C, that are preferably but not necessarily mutually normal, are pivoted about their intersection at point O. A link H is pivoted to arm C at a distance from O equal to $r_0(A+1)$ for any value of $r_0$, although $r_0(A+1)$ need not be actually measured. A slide is mounted for movement along arm C and carries an upright of unit length, with its outer end pivotally connected with link H, and spaced from the pivot point of link H and arm C by the initial distance $(A+1)$. The basic triangle (to the left of O) comprises the fixed side, of unit length, the side of length A pivoted to the unit side, and the third side D, connected at one end to point O and at the other end to the aforesaid slide, carrying the upright.

As link H and arms B and C are conjointly rotated about O, the upright is shifted so that its distance from the intersection of link H with arm C is maintained at D by the basic deformable triangle. The device thus continuously sets up similar triangles such that, with $r_0$ equal to the initial intercept of link H upon arm B, $$r/1 = r_0(A+1)/D$$

and the intercept of H and B has a distance from O at all times equal to the desired radius (or polar coordinate of the arc).

In Figs. 27 to 31, inclusive, there is shown a modification embodying the principles of operation disclosed at Figs. 8 and 9 and in which the various geometrical figures are simulated by means of rods or tubes. A base 160 has apertures spaced a unit distance, center to center. Each of these apertures receives a threaded pivot 161 and 162. Each pivot is pointed at its lower end and is held in relation to base 160 by nuts threaded thereon and engaging opposite sides of the base as shown at 163, Figs. 28 and 30. Each pivot has a shank of reduced diameter at its upper end, as shown at 164. The end of a rod 165, of effective length A, is forked at one end, as at 166, and pivoted upon the reduced shank of pivot 161. A pivot block 167 has a bore receiving the other end of rod 165 and is adapted to be secured in adjusted position along said rod, by means of a set screw 168. A second block 169 is pivoted to block 167, as at 170, on an axis that is normal to the axis of rod 165. Block 169 has an aperture receiving a rod 171 and adapted to be fixed in adjusted position on said rod, by means of a set screw 172. Thus, by loosening screws 168 and 172, blocks 167 and 169 may be adjusted as a unit, to thereby vary the effective value of the dimension A.

A pivot block 173 has an upper bore slidably receiving rod 171, and a parallel lower bore within which fits the end of a base rod 180. The end of rod 180 within this bore is forked, as clearly shown at Figs. 28 and 30, to receive the adjacent end of link 175. The reduced end of pivot 162 passes through aligned apertures in block 173, the forked end of rod 180, and link 175, whereby the link may pivot relatively to the block and rod, while the block and rod are united in fixed relation. A rod or arm 176 is secured to block 173 and extends perpendicularly to rods 171 and 180. The outer end of rod 176 carries a support comprising a block 177, adjustably fixed along the rod by means of a set screw 178, and having a leg 179 of the length necessary to support rod 176 parallel to the drawing surface.

At its other end, rod 180 has a block 181 slidably mounted thereon and secured in adjusted position by a set screw 182. A support 183 is threaded into the lower side of this block and a pivot bolt 184 is threaded into the top side thereof. A hub 185 is journaled on bolt 184 and has a bore radial of the axis of said bolt accommodating a rod 186. As the bolt also passes through a transverse hole in the rod, the hub and rod are thereby fixed together. A member 187 has a bore slidably fitting base rod 180. This member also has a second parallel bore within which fits the slotted end of rod 171. This slot receives one end of a link 188 and a pivot pin 189 passes through aligned holes in the member 187, the forked end of rod 171, and link 188, to pivotally connect link 188 and member 187, while fixedly uniting the rod and member. Thus rods 171 and 180 are mounted for pivoting in unison about the axis of pivot 162, while, at the same time, rod 171 may be reciprocated axially along rod 180 so that the axes of the two are at all times parallel. The other end of link 188 is pivoted between the forked ends of rod 186, as shown at 190, Fig. 28.

A second hub 191 is journaled upon bolt 184 immediately above hub 185 and has a radial bore accommodating a rod or link 192 that passes over and intersects arm 176 throughout the range of movement of the instrument. As bolt 184 passes through a transverse hole in link 192, the latter is thereby fixedly united with hub 191.

Figures 27, 28, 29, 30, 31:
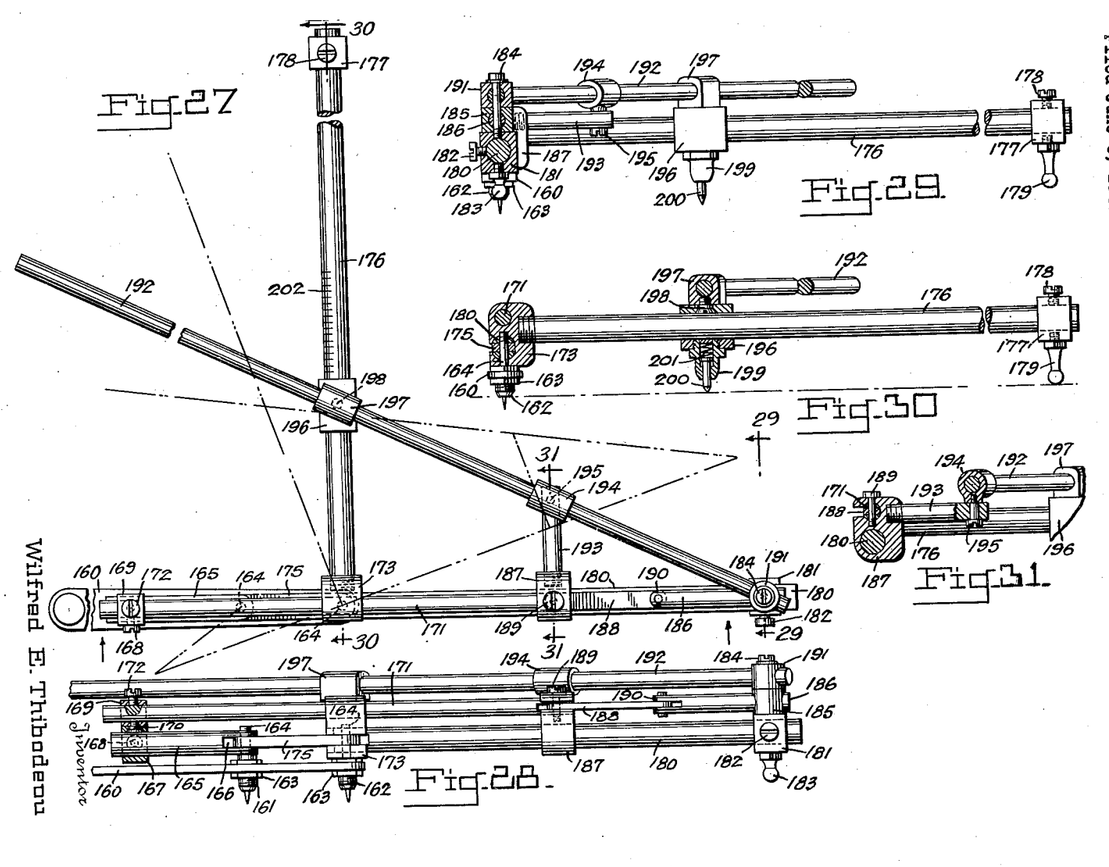
Fig. 27 is a plan view of another modification of my invention embodying the principles of operation disclosed at Figs. 8 and 9 and using rods or tubes for the various linkages.
Fig. 28 is an elevational view of the instrument shown at Fig. 27, looking in the direction of the arrows, Fig. 27.
Fig. 29 is a section taken upon the line 29—29 of Fig. 27 and showing the pivot axis for the main link as well as the vertical spacing of the several links or rods.
Fig. 30 is a section taken upon line 30—30, Fig. 27, showing in detail the main scriber arm, the scriber slidable thereon and the combined fixing point and pivot in the base member.
Fig. 31 is a section taken upon line 31—31 of Fig. 27 and showing the sliding pivotal connection between the main link and one arm of the guide member.

Member 187 has an arm 193 of unit effective length, secured thereto by threading, as shown at Fig. 31. The outer end of this arm is pivotally connected with a sleeve 194, by means of a pivot screw 195. Link 192 slidably fits sleeve 194. The intersection of arm 176 and link 192, is materialized by sleeves 196 and 197, pivotally connected by a screw 198 intersecting the bore of both sleeves at right angles. A scriber or stylus barrel 199 is threaded into an aperture in the lower side of sleeve 196 and carries a stylus or scriber 200. A spring 201 is positioned within the barrel and acts to urge scriber 200 outwardly into engagement with the drawing surface. It will be noted that the connection afforded by link 188 prevents member 187 from any rotation or wobble about the axis of base member 180 while the instrument is being adjusted for the selected value of $r$.

In operation, with the parts in initial position, as shown in Figs. 27 and 28, set screws 172 and 182 are loosened and slide 196 is moved along scale 202 on arm 176 to the desired value of $r_0$, while block 181 correspondingly moves along base rod 180. As rod 186 is maintained in alignment with base rod 180 at this time, and is connected with rod 171 through link 188, rod 171 is correspondingly axially translated. Set screws 172 and 182 are now tightened and the instrument is located with scriber 200 at the mid-point of the arc it is desired to draw and with the point of pivot 162 on the radius of the arc through said point while the pivot point of 161 lies upon the chord of the arc through pivot 162. Arm 176, rods 171 and 180, and link 192 are swung about the point of pivot 162 as a center. Since the side of the basic triangle of unit length, materialized by the distance between the points of pivots 161 and 162 on base 160, remains fixed, rod 165 pivots about the axis of pivot 161 as the parts are rotated, and rod 171 is axially translated relatively to rod 180 in accordance with the change in the dimension D, which varies as a function of the angle $\alpha$. This dimension is transmitted by rod 171 to vary the distance between pivot pin 189 and bolt 184. As this distance varies, arm 193 is translated along rod 180 to inversely vary the angular relation between link 192 and base rod 180 so that the intersection of link 192 with arm 176, moves outwardly along said arm as the parts are rotated. Thus scriber 200 traverses and describes the desired arc.

It will be understood that, whereas, in the embodiment shown, the adjustment for the values of A is indicated as controlled by a set screw, a finer adjustment may be provided in various ways and construction well known in the art.

Figures 32, 33, 34, 35, 36, 37, 38:
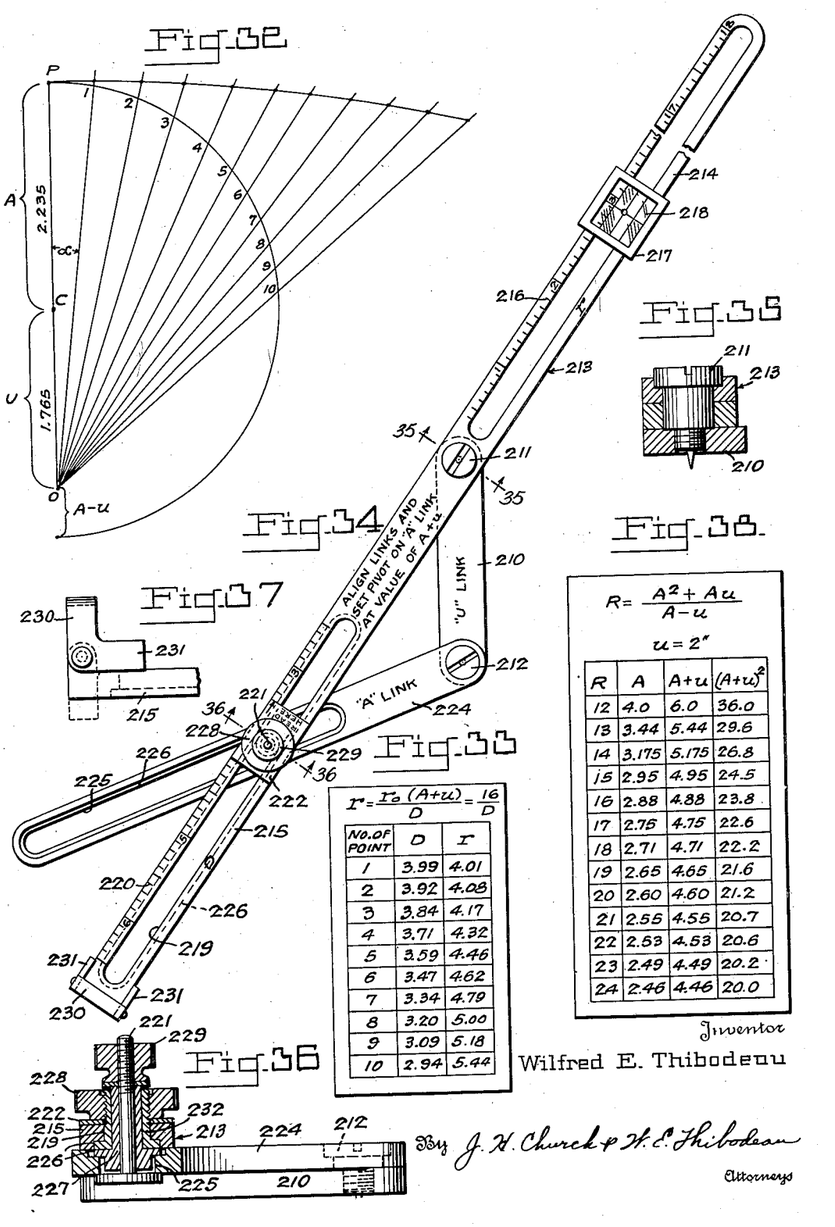
Fig. 32 is a view showing the method of constructing an arc of long radius and inaccessible or inconveniently located center using only standard drafting instruments.
Fig. 33 shows a convenient chart by which the values of $r$ corresponding to arbitrarily-selected points may be listed.
Fig. 34 is a plan view of an embodiment using only three inter-pivoted links for laying off points upon an arc of predetermined radius and passing through a selected or desired point.
Fig. 35 is a section taken upon the line 35—35, Fig. 34, showing the pivotal connection between two of the links.
Fig. 36 is a section taken upon the line 36—36 of Fig. 34 and showing the adjustable pivot connection between two of the links.
Fig. 37 is a side elevation of the end of the main link showing the latch adapted to be turned down to secure the links in aligned position.
Fig. 38 is a view showing a chart supplied with each instrument to facilitate the rapid location of points on arc of desired radii.

In Fig. 32 the basic triangle has sides A and U. A semicircle of radius A is described about the end of U and radial lines drawn from the other end of U (point O) at various values of $\alpha$.

If $A+U$ be taken equal to $r_0$ we have $$r = \frac{(A+U)^2}{D}$$

or $$rD = (A+U)^2$$

From the values of this equation at $\alpha=180°$ it will be clear that $$R = \frac{A+U+\frac{(A+U)^2}{A-U}}{2} = \frac{A^2+AU}{A-U} \quad (3)$$

Therefore, when it is desired to draw an arc of a certain radius, through a given mid-point P of said arc, a line is first drawn through said point representing a portion of the radius to said point from the inaccessible or inconveniently-located center of the arc. A convenient distance is then laid off from point P on said radius. This distance represents $A+U$ and since it is known, simultaneous solution with Equation 3 gives the values of A and U. As an example of one solution, let it be required to draw an arc of 19″ radius through point P, Fig. 32, and let $A+U=4″$. Substituting the value $A=4-U$ in Equation 3 and solving, we get $U=1.765″$, and $A=2.235″$. Now the distance 2.235″ is laid off from P along the aforesaid radius and the point C, representing one end of the unit length is thus located. The distance 1.765″ is then laid off from this point along the radius, to locate the other end O of said unit length or the point from which values of $r$ are to be measured.

An arc of radius 2.235″ is struck, using C as a center and covering the desired angular extent about point O, of the arc to be drawn. This arc is divided into convenient points that may be selected at random such as the points 1, 2, 3 etc. and radial lines of convenient lengths are drawn through these points and point O. From the fundamental equation, $r=r_0(A+U)/D$, and since by construction, we have made $r_0$ and $(A+U)$ equal to 4″, the value of $r$ measured along any radial line through point O and the respective points 1, 2, 3, etc., will be $4^2/D$ or $16/D$, where D is the distance from O to the selected point 1, 2, 3, etc. A chart as in Fig. 33 is formed and values of D are taken from Fig. 32 with an engineer's scale, and listed in the appropriate column. A slide rule is now used to compute the values of $r$ as listed in the chart and these values of $r$ are laid off along the respective radial lines from point O. A fair curve is then drawn through the points thus located to give an arc of the desired radius through the desired point. The entire procedure may be rapidly performed with only one setting of the sliding scale of the slide rule and gives a mathematically exact arc of any desired radius. It is interesting to note that, when $A=U$, R becomes infinite and the computations give a straight line.

This suggests that the method disclosed is of great utility where it is desired to locate two lines at right angles to each other with an extremely high degree of accuracy, as in laying out building or boundary lines or in tool design or manufacture. Note that, in contradistinction to the 3—4—5 triangle method commonly used, the present method requires no intersecting arcs but only the laying out of distances and that the accuracy is limited only by the limits of accuracy in reading a tape, scale or micrometer. While for convenience, $r_0$ and $(A+U)$ have been taken as equal, this is by no means necessary since in a given problem, $r_0$, A and U are constants and the ratio of $A+U$ to $r_0$ may have any proportionality factor $k$ other than unity.

At Fig. 34 I have shown an embodiment of the invention well adapted to facilitate the location of any desired number of points upon an arc of desired radius through a given point. From Equation 3 it will be noted that, for a fixed value of U, the value of A for any fixed radius of arc is fixed. For example, suppose U is given a value of 2″. Then, for an arc of radius of 19″, A must have a value of 2.65; and $A+U=4.65$. This principle is conveniently utilized in the instrument of Figs. 34 to 38, inclusive, where the numeral 210 indicated a unit link shown as 2″ in length between the axes of a pivot screw 211 and a second pivot screw 212. Both pivot screws are identical and 211 is shown at Fig. 35.

It will be noted that the screws have pointed ends for penetration of the supporting surface whereby link 210 may be fixed in position thereon. A main or $r$ link 213 is pivoted upon screw 211 and, as shown, has a relatively long arm 214 that may be, for example, 18″ long, and slotted throughout its length, and an oppositely extending shorter arm 215 approximately 6½" in length and slotted as shown at 219. Arm 214 is graduated in inches and tenths, as shown at 216 with the axis of screw 211 as origin. A slider 217 is mounted upon arm 214 and consists of a simple frame embracing the edges of the arm 214. If desired, the slide may have inwardly-directed side flanges engaging longitudinal grooves in the sides of the arm, or such flanges may be omitted so that the slide can be lifted off the arm. The frame carries a window 218 having mutually normal indicator lines scored therein with a hole at the intersection of said lines whereby points may be located lying exactly upon the radial line from the axis of screw 211.

The arm 215 of main link 213, is slotted, as at 219, and a scale 220 is provided therealong, and so graduated that the distance of pivot bolt 221 from the axis of screw 211, is indicated at the reading edge of a slide or washer 222 positioned on said pin and maintained in the angular position shown by a lug fitting between the side edges of the slot and located at said reading edge. A clip 230 is pivoted on lugs at the free end of arm 215. This clip has projections 231 which, when said clip is turned 90° from the position shown at Fig. 37, project below the lower surface of arm 215 and may thus engage the sides of A link 224, to hold it in exact alignment with arm 215.

Link 224 is slotted as at 225 and both slots 219 and 225, are rabbetted as shown at 226 to provide shoulders. The pivot, including bolt 221 passing through both slots 219 and 225, is of the same construction as that shown at 30, Fig. 12, so that it is sufficient to point out, in connection with Figs. 34 and 36, the sleeves 227 and 232, the nut 228 threaded upon sleeve 232 and the nut 229 threaded upon bolt 221. Thus, when both nuts are loose, the pivot bolt may be slid freely along slots 219 and 225, while when both nuts are tightened, the link 224 is locked to arm 215. With nut 229 tightened, and 228 loosened, the bolt is locked to link 224, but may slide relatively to arm 215.

To facilitate its use, I propose to provide a chart to accompany each instrument, as shown at Fig. 38, and having a first column in which are given the radii of the arcs, a second column giving corresponding values of A for the constant U of the instrument (2" in the model shown), a third column with values of $A+U$ and a fourth column giving corresponding values of $(A+U)^2$. To locate points upon the arc of a circle of predetermined radius and passing through a predetermined point, the value of $(A+U)$ and $(A+U)^2$ for that radius, are taken from the chart. The links and arms are aligned by the use of clip 230 and pivot bolt 221 is slid until the reading edge of slide 222 indicates the value of $A+U$ on scale 220. Nut 229 is then tightened to lock bolt 221 to link 224. The point of screw 211 is then located at the point through which it is desired to have the arc pass, while the point of screw 212 is positioned upon a radius of the circle in case it is desired to scribe the arc about a center located in a definite direction. Link 213 is now rotated about screw 211 through any desired angle. This movement causes link 224 to pivot and slide 222 to move along arm 215. The indicated value on scale 220 is then read and used to divide into the previously-determined value of $(A+U)^2$, as by means of a slide rule. Then, without moving link 213, slide 217 is moved until the value of the quotient just determined, is indicated by the transverse line on window 218. A mark is then made through the hole in said window. The link 213 is pivoted to a new position and another point located along scale 216. In this way, as many points as desired may be located upon the arc.

The foregoing procedure is but one of the many ways in which the instrument may be used. In fact, by applying the Equations 2 and 3, arcs of circles of any length of radius whatsoever, may be precisely and accurately determined, it being noted that, in the model shown, $r_0 = A+U$, where U equals the unit distance of the basic equation.

It will be understood that a device similar to that of Fig. 34 may be constructed in which the U and A links have fixed lengths $n$ and $nA$ respectively, $r$ being calculated from Equation 2 for the various values of D as determined by the base of the $n$, $nA$, D triangle.

It is within the purview of my invention to substitute a chart for Fig. 38, wherein the relations between R, $A+U$, and $(A+U)^2$ are given by two curves having values of R as abscissae and values of $A+U$ and $(A+U)^2$, as ordinates. Such curves will obviate the necessity for interpolation in those cases where the desired radius is not an integer.

While I have shown members 11, 74, as having their constituent parts or arms in mutually normal relation it will be clear that this is for convenience only, and that said parts may within practical limits have angular relations other than 90°.

While I have shown a preferred form of my invention, together with several modifications, numerous changes, substitutions of equivalents and re-arrangement of parts will occur, or be obvious to those skilled in this art. Therefore, I do not wish to be limited to the precise details of construction shown. On the contrary, I wish to reserve all such changes, modifications, arrangements and substitutions as fall within the scope of the subjoined claims.

For instance, while several forms have been shown whereby the final result for $r$ is reflected through similar triangles after mechanical solution of D it will be obvious that many such arrangements are possible and will be obvious in various combinations and on the various coordinate axes or in intermediate axes. And while the unit or U side of the basic triangle has been shown as the fixed side, it may be the side movable through the angle $\alpha$. While graduations have been shown, these may be omitted and the distances scaled as in the use of an ordinary compass. While the fixed points of the basic triangle has been shown as coinciding with the pivots thereon, such is not essential and this size may be fixed at any point and have any convenient length.

Throughout the specification the device has been referred to as one for "describing" an arc. Thus it is not intended that it be limited to any instrument for "scribing" an arc. Conceivably it might be employed for carrying a grinding or cutting tool, space considerations being of prime importance in machinery.

Alternatively, Equation 3 may be expressed in the form $$U = A\frac{(R-A)}{(R+A)}$$

Thus, when it is desired to first assume a value for A in the location of points upon the circumference of a circle of relatively large, predetermined radius and having an inaccessible or inconveniently-positioned center, the corresponding value of U may be obtained, often by mere mental computation. As an example, suppose it is desired to lay out an arc of a circle of 20 feet radius and passing through a given point P and that 5 feet is selected as a convenient length for A. Then $$U = \frac{5 \times 15}{25} = 3$$

and $(A+U)^2 = 64$. The consecutive distances A and U are then laid off from P along a known or selected radius of the arc to locate points such as C and O, Fig. 32. A suitable number of arbitrarily-selected points corresponding to the points 1, 2, 3, 4, etc., Fig. 32, are located upon the circumference of a circle having point C as a center.

Now, taking a tape and locating its zero graduation at point O, the distance to point 1 is measured, divided into 64, and without moving the tape, the quotient is laid off, to locate a first point of the desired arc. Points 2, 3, etc., are similarly treated and corresponding points upon the desired arc are located.

It should be noted that, while the method has been described as being carried out with plotting centers located upon the concave side of the arc, that is, between the arc and its true center, this is by no means necessary. In fact, one highly useful aspect of the invention is that arcs of any radius may be determined and generated from the convex side. Such a procedure might be desirable, for example, where an arc must be drawn closely adjacent and with its concave side facing, the edge of a drawing, or where an arcuate wall, side wall, or embankment is to be constructed along the shore of a bay or bank of a river. In such cases it is merely necessary to remember that the radius R is negative with respect to the values of A and U and should be so written in the use of formula (3).

To take the example previously used, suppose it is desired to lay out the arc of a circle of 20′ radius from the convex side thereof, and that a value of A of 4′ is chosen. Formula (3) is now applied in which the value $R = -20$ is used. Thus the value of $U = 6′$ is obtained and $(A+U)^2 = 100$. The point P is then selected through which the arc is to pass, and second and third points are located along the radius, extended, at 4′ and 10′ from P. With the second point as a center, any desired number of measuring points upon the circumference of a circle of radius 4′ are selected so as to embrace the angular extent of the arc to be drawn. The distances of these points from the aforesaid third or "A+U" point are then measured, and conveniently tabulated and each distance so obtained is divided into 100. The resulting values are then laid off along the radial lines through the respective measuring points to locate points upon the desired arc and through which a fair curve may be passed. Thus the process is carried out with equal facility irrespective of the side of the arc upon which the plotting and measuring points are located. It will be noted that, in all cases where the plotting and measuring points are upon the concave side of the arc to be determined, A has a numerical value greater than $u$, while, when the aforesaid points are to be located upon the convex side of the arc, A has a numerical value less than $u$. When the two are equal, the resulting "arc" is a straight line, as previously explained. While I have described the process as that of plotting or describing an arc it will be realized that it is operable throughout 360° and hence may be used to form a complete circle when desired.

In this way, any number of points may be located upon the arc of a circle having any length of radius whatsoever and using only a limited space. Furthermore since only linear measurements are involved, the possibility of error is reduced to a minimum, while the accuracy and precision of the method are limited only by the instrument used to measure and lay off distances.

In general, this invention is basic to the triangle linkage which solves the complex portion of Equation 2, and it should be noted that a basic triangle having any values whatever for its two collapsing sides will determine a value of D for some circular arc. Likewise, where adjustments for the value of A have been shown in some modifications such may be included in any form of the invention.

I claim:

1. In an arc defining instrument, a base having first and second pivot axes, first and second members each comprising first and second angularly-related arms, said first arms being connected for coincidental sliding movement to maintain said second arms parallel, said first member being pivoted on said first pivot axis, a link pivoted on the first arm of said first member at a point remote from said first pivot axis and also pivoted on the second arm of said second member, said link intersecting the second arm of said first member, and means constraining a point on the first arm of said second member to rotate about said second pivot as a center.

2. An arc scribing instrument comprising a base having first and second parallel pivot axes spaced in a first direction, a first member having first and second angularly-related arms extending radially of said first pivot, a second member shaped to define first and second angularly related arms, means connecting said first arms for coincidental sliding movement, a link pivoted at predetermined points on said first arm of said first member and said second arm of said second member, means constraining a point on the first arm of said second member to circular movement about said second pivot axis, and scriber means controlled jointly by said link and said second arm of said first member, to materialize the point of intersection thereof as said members are swung about said first pivot axis.

3. In an instrument for scribing arcs of long radii, a base having means defining a first pivot axis having means whereby to be fixed to a surface, first and second members having first arms extending radially of said axis and connected for parallel relative sliding movement only, said first member being pivoted on said axis, said members having second arms extending in parallelism angularly from said first arms, means defining a second pivot axis spaced unit distance in one direction from said first axis, a link of predetermined effective length pivoted at one point on said second axis and at a second point on said first arm of said second member, a second link pivoted on the first arm of said first member at a distance from said first pivot axis equal to the sum of said predetermined length and unit distance in the other direction, means pivotally connecting said second link at a predetermined variable distance along the second arm of said second member, and a scriber jointly controlled by said second link and said second arm of said first member to continuously materialize their point of intersection as said members are conjointly rotated about said first pivot axis.

4. In an arc drawing instrument, a first member having angularly-related first and second arms extending radially from a first fixed pivot axis, a second member slidable in a path along said first arm, a link pivoted at one point to said first arm and at a second point to said second member and offset from said path, means constraining a point on said second member, lying in said path, to rotation in a fixed path about a second fixed pivot axis, and a scriber jointly controlled by said link and second arm continuously materializing their point of intersection.

5. A curve-tracing instrument comprising a first member rotatable about a first pivot axis and defining angularly-related first and second paths radially of said axis, a second member constrained to sliding movement only, along said first path, a first link pivoted on said first member at one point in said first path and at another point on said second member offset from said first path, means constraining a point on said second member lying in said first path to rotation about a second pivot axis spaced from said first pivot axis, and scriber means slidable along said first link to materialize its intersection with said second path.

6. In a curve-scribing instrument, a first member rotatable about a first pivot axis, said member defining angularly-related first and second paths extending radially from said first axis, a second member connected for translation on said first member along said first path, a link pivoted on said first member at a point in said first path a predetermined distance on one side of said first pivot axis, means pivoting said link on said second member at a point offset to one side of said first path, means guiding a point on said second member in a circular path of predetermined radius about a second pivot axis spaced unit distance from said first axis, said point on said second member lying on said first path on the other side of said first pivot axis, and scriber means controlled by said link to materialize its intersection with said second path.

7. In an arc-scribing instrument, a first member pivoted about a first pivot axis and defining first and second mutually normal guide paths extending radially of said axis, a second member connected for pivotal movement with said first member and for translation relatively thereto along said first path, a first link pivoted on said first member at a point on one side of said first pivot axis lying in said first path, means pivotally connecting said first link and second member at a point offset an adjustable distance from said first path, a second link pivoted at one end to said second member at a point in said first path on the other side of said first pivot axis and at its other end to a second pivot axis spaced from said first pivot axis, and scriber means slidable along said first link to automatically materialize the point of intersection of said first link and second guide path.

8. In a scribing instrument, a pair of members slidably connected for relative translation along a first path extending radially of a pivot axis common to said members, a link pivoted on one member on an axis normal to and intersecting said path, there being a longitudinal undercut channel on each side of said link, a first pivot bolt having a head slidably guided in one said channel and slidably fitting a slot in the other member, said slot defining a path normal to said first path, a second pivot bolt having a head slidably guided in the other channel and slidably fitting a slot in said one member, and scriber means carried by said first pivot bolt.

9. In a curve-scriber, first and second members each having right-angularly-related first and second arms, said first arms being connected for relative sliding movement in the direction of their length to maintain said second arms parallel, said first member being pivoted on a first fixed point at the intersection of its arms, a link pivoted on said first arm of said first member and said second arm of said second member, and means constraining a point on the first arm of said second member to rotation about a second fixed point on a predetermined radius, and means controlled by said link and second arm of said first member, to scribe the locus of their intersection as said members are rotated about said first point.

10. A device for describing an arc of a circle comprising arms fixed at right angles to each other, a first lever articulated on one of the arms, a second lever articulated at the intersection of the two arms, a third lever articulated to the second lever, an arm articulated to the distal end of the third lever and arranged to slide along the arm to which the first lever is articulated and carrying an arm slidingly engaging the first lever to turn it about its point of articulation in response to motion of the sliding arm.

11. A device as in claim 10 wherein said second and third levers bear a length ratio of $R-r_0$ to R where R is the radius of the desired arc and $r_0$ is the predetermined maximum height of the arc above its chord.

12. A device as in claim 10 wherein said second and third levers bear a length ratio of $R-r_0$ to R where R is the radius of the desired arc and $r_0$ is the predetermined maximum height of the arc above its chord and said arm carried by the sliding arm has a vertical height equal to $r_0$.

13. A device as in claim 10 wherein said second and third levers bear a length ratio of $R-r_0$ to R where R is the radius of the desired arc and $r_0$ is the predetermined maximum height of the arc above its chord and said arm carried by the sliding arm has a vertical height equal to unity.

14. A device for mechanically solving the value of the expression $\cos \alpha + \sqrt{A^2 - \sin^2 \alpha}$ comprising an arm, a first lever articulated to the arm, a second lever articulated to the first lever and articulated to and slidable along the arm, the ratio of the effective lengths of the levers being $n : nA$ and $\alpha$ being the angle between the first lever and the arm as the second lever slides along the arm.

15. In an instrument for describing the arcs of circles, a member comprising first and second angularly-related rods extending radially of and rotatable as a unit about a first axis, first and second blocks slidable on said first rod, means fixing said first block in adjusted position along its rod, a third rod parallel to and slidably connected with said first rod through said second block, a link pivoted on said first block and intersecting said second rod, an arm extending from said second block and having pivotal sliding connection with said link, interpivoted slidable sleeves on said second rod and link, respectively, to materialize their intersection, and means rotatable about a second axis spaced a predetermined distance from said first axis, and connected to slide said third rod and thereby said second block and arm, as said rods are rotated as a unit about said first axis.

WILFRED E. THIBODEAU.

REFERENCES CITED

The following references are of record in the file of this patent:

UNITED STATES PATENTS

| Number | Name | Date |
|---|---|---|
| 759,566 | Stout | May 10, 1904 |
| 1,010,612 | Garinger | Dec. 5, 1911 |

FOREIGN PATENTS

| Number | Country | Date |
|---|---|---|
| 4,155 | Great Britain | Dec. 18, 1873 |
| 16,698 | Great Britain | July 20, 1911 |
| 540,266 | France | Apr. 14, 1922 |